| (12) United States Patent<br>Caiti et al. | (10) Patent No.: US 8,587,149 B2<br>(45) Date of Patent: Nov. 19, 2013 |
|---|---|

(54) ELECTRONIC PROTECTION UNIT FOR AUTOMATIC CIRCUIT BREAKERS AND RELATIVE PROCESS

(75) Inventors: Matteo Caiti, Gorle (IT); Giovanni Frassineti, Mozzo (IT)

(73) Assignee: ABB S.p.A., Milan (IT)

( * ) Notice: Subject to any disclaimer, the term of this patent is extended or adjusted under 35 U.S.C. 154(b) by 627 days.

(21) Appl. No.: 12/812,540

(22) PCT Filed: Jan. 9, 2009

(86) PCT No.: PCT/EP2009/050232
§ 371 (c)(1),
(2), (4) Date: Aug. 16, 2010

(87) PCT Pub. No.: WO2009/090143
PCT Pub. Date: Jul. 23, 2009

(65) Prior Publication Data
US 2010/0321837 A1    Dec. 23, 2010

(30) Foreign Application Priority Data
Jan. 14, 2008   (IT) ............................... MI2008A0048

(51) Int. Cl.
*H02J 7/00*   (2006.01)
*H02J 9/00*   (2006.01)

(52) U.S. Cl.
USPC .......................................................... 307/64

(58) Field of Classification Search
USPC ................................. 307/64; 340/693.2, 635
See application file for complete search history.

(56) References Cited

U.S. PATENT DOCUMENTS

| 5,796,347 A | 8/1998 | Zulaski |
| 2006/0164065 A1 | 7/2006 | Hoouk et al. |
| 2006/0212137 A1 | 9/2006 | Sone |
| 2008/0084117 A1 * | 4/2008 | Sander et al. ................... 307/46 |

FOREIGN PATENT DOCUMENTS

DE   19744204 A1   4/1999

* cited by examiner

*Primary Examiner* — Carlos Amaya
(74) *Attorney, Agent, or Firm* — Novak Druce Connolly Bove + Quigg LLP

(57) ABSTRACT

Electronic protection unit comprising a control unit and a main and auxiliary power supply stage to supply electrical power to said control unit. The auxiliary power supply stage comprises electronic means suitable to generate an auxiliary power supply voltage, in response to a light radiation received in input. In a further aspect, the present invention relates to a process to manage an electronic protection unit of a power line, in emergency condition.

17 Claims, 4 Drawing Sheets

ELECTRONIC PROTECTION UNIT FOR AUTOMATIC CIRCUIT BREAKERS AND RELATIVE PROCESS

CROSS REFERENCE TO RELATED APPLICATIONS

This application is a National Phase filing under 35 U.S.C. §371 of PCT/EP2009/050232 filed on Jan. 9, 2009; and this application claims priority to Application No. MI2008A000048 filed in Italy on Jan. 14, 2008 under 35 U.S.C. §119; the entire contents of all are hereby incorporated by reference.

The present invention relates to an electronic protection unit for automatic circuit breakers and relative process.

In particular, the present invention relates to an electronic protection unit and to a process that allow acquisition, in emergency conditions, of information relative to the operating state of a power line.

The use of electronic protection units on automatic circuit breakers is known.

An electronic protection unit is a device suitable to detect, through specific sensors, the operating conditions of a power line and, in the event of faults or overloads, to generate tripping commands destined to trip an automatic circuit breaker suitable to interrupt said power line.

Besides performing the detection and command functions mentioned above, an electronic protection unit can also provide information of various kinds relative to the operating state of the power line.

The availability of this information, which, for example, is useful for diagnosing failures and faults, can vary from model to model.

In electronic units of the simplest type, the information available, in practice, consists in simple visual indications, provided by the operator through warning interfaces (i.e. "short circuit" or "overload" warning flags). Although these warning interfaces have the advantage of storing the indication of the type of fault that occurred even if there is no power supply, the information provided to the operator is somewhat limited both from the viewpoint of quantity and quality.

More advanced electronic units are available, capable of managing sophisticated sets of data, which can be translated into complete and articulate information for the operator, which can, for example, concern the network frequency, the amplitude of the phase currents or voltages (with real time data, or statistical data, recorded for example when a failure occurs), or the progressive number of the failure, of the fault or of the tripping operation, the interrupted current or interrupted power value, and so forth. This information can also be obtained from complex processing operations of all the data available (for example, statistical data relative to previous failures, estimation of the residual service life of the circuit breaker, simulation of the so-called thermal memory, and so forth).

In these sophisticated electronic units, the operator is provided with the available information through warning interfaces of various kinds, preferably alphanumeric or graphic displays. Given their relative complexity, these modern electronic units consume considerable amounts of power and in order to operate, require adequate electrical power supply levels. The supply of these devices is generally obtained with appropriate technical arrangements from the same power line on which the automatic circuit breaker is installed (direct power supply), or from external electrical power sources (indirect power supply).

Unfortunately, in the absence of direct and indirect power supply (which occurs, for example, following tripping of the circuit breaker or simply in the event of a black-out), these modern electronic units are unable to function, in particular to supply indications concerning the operating state of the power line.

It is evident that this drawback occurs in those very operating situations in which information regarding the state of the power line would be most useful to the operator, i.e. following a failure or fault.

To overcome these drawbacks, electronic protection units of the type described in the patent application EP1589628 have been introduced.

This electronic unit is provided with backup electronic circuits, suitably designed to accumulate a certain quantity of electrical power, during normal operation, and to supply the electronic protection unit using this accumulated power, when there is no power supply.

However, technical solutions of this type have the drawback of guaranteeing electrical power to the electronic protection unit, and consequently access to the information available, only for predetermined periods of time, starting from the moment in which the power supply is cut off.

However, in the event of the electronic unit being located in difficult environmental conditions, the operator might reach the power line to inspect it after a relatively long period of time, in excess of the run-down period of the aforesaid backup circuits. In this case, the information concerning the state of the power line would again be completely inaccessible.

The main aim of the present invention is to provide an electronic protection unit for automatic circuit breakers and a relative process which allows the aforesaid drawbacks to be solved.

This aim is achieved by an electronic protection device, for automatic circuit-breakers according to claim 1.

The electronic unit according to the invention, in its most general definition, comprises an auxiliary power supply stage, provided with electronic means capable of converting an external light radiation into auxiliary electrical power, which can be utilized for partial or full operation of the electronic protection unit.

This light radiation can be supplied by the operator in a very simple manner, for example by illuminating the outer surface of the electronic unit by a light source, for example making use of the lighting system present in the substation (or panel) or of sunlight, or using an electric torch.

The electronic unit according to the invention can therefore be activated, at least partially, in any environmental situation and also after prolonged periods of time in which the main power supply is absent.

The operator can therefore access the information relative to the state of the line at any time, according to requirements, without necessarily having to take into account the run-down times of any backup circuits.

In a further aspect thereof, the present invention also relates to a process to manage an electronic protection unit in emergency conditions according to claim 15.

Further characteristics and advantages shall be more apparent from the description of preferred but non-exclusive embodiments of the electronic protection unit according to the invention, illustrated by way of indicative and non-limiting example with the aid of the accompanying drawings, wherein.

With reference to the aforesaid figures, the present invention relates to an electronic protection unit 1 for automatic circuit breakers.

Figure 3:
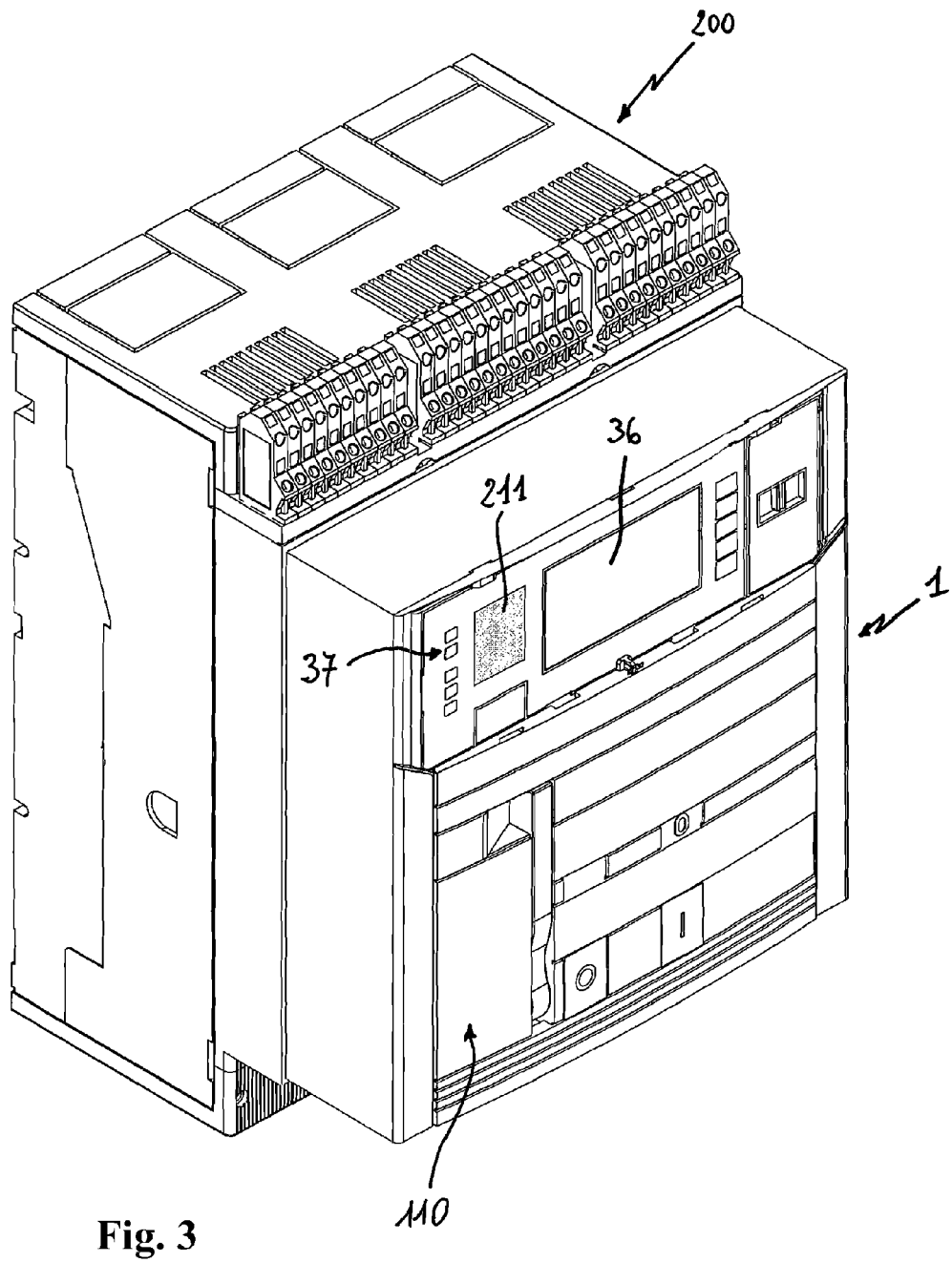
FIG. 3 is a view of an automatic circuit breaker comprising the electronic protection unit according to the invention.
Figure 4:
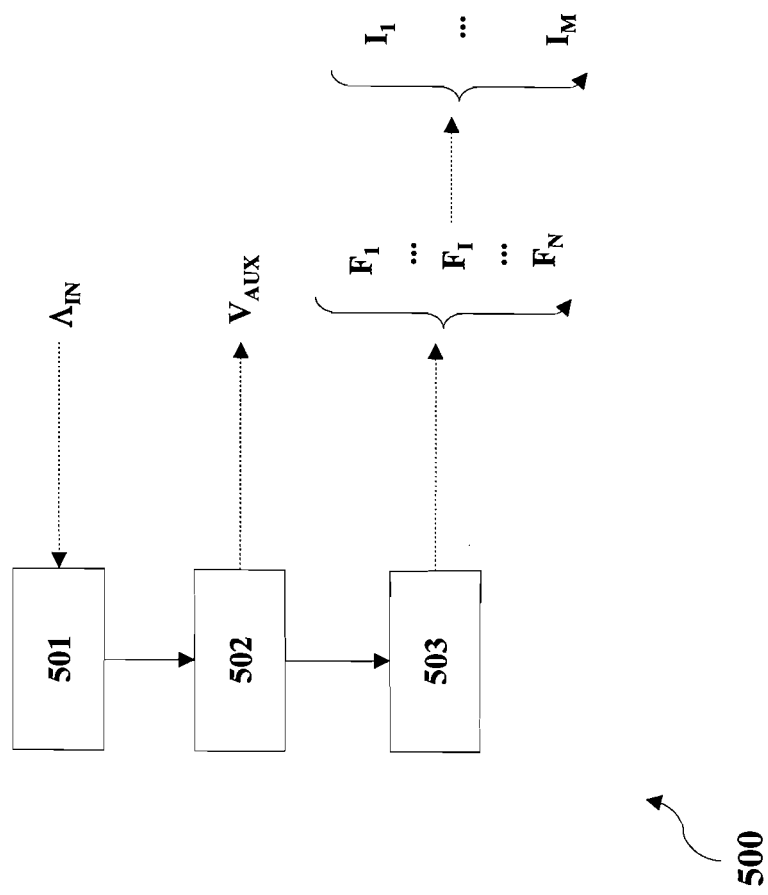
FIG. 4 is a block diagram relative to a detection process which forms a further aspect of the present invention.

FIG. 3 shows the electronic unit 1 installed on a low voltage automatic circuit breaker 200 (for example, for operating voltages below 1 kVac or 1.5 kVdc). Naturally, the electronic unit 1 can be installed on other types of circuit breakers (for example with different operating voltages) or can be located in a remote position with respect to the circuit breaker to be controlled.

The electronic unit 1 is suitable to detect the operating conditions of a low voltage power line 90 (of single-phase or multi-phase type, i.e. three-phase), through appropriate current sensors 80, and to send, if necessary, a tripping command TC to the automatic circuit breaker 200, in order to interrupt the power line 90.

Figure 1:
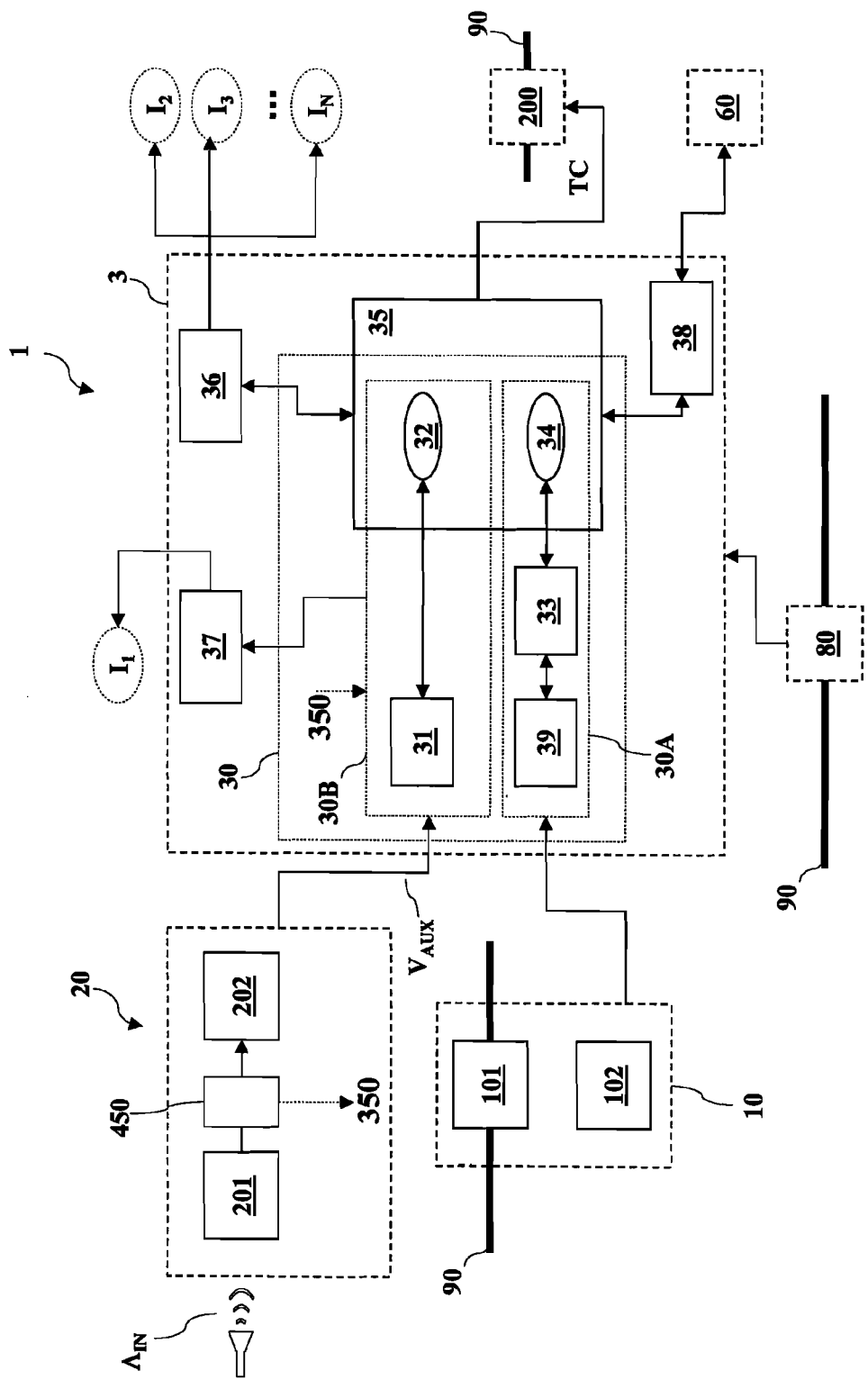
FIG. 1 is a schematic block diagram of the structure of the electronic protection unit according to the invention.

The electronic unit 1 comprises (FIG. 1) a control unit 3, advantageously provided with a microcontroller 35, one or more warning devices, for example a display 36 and/or electronic devices 37 of the LED (Light Emitting Diode) type, and with a communication interface 38, for example a serial port for data reception/transmission from/to a remote device 60 (i.e. a further electronic protection unit).

A main power supply stage 10 is provided to supply the electronic unit 1, in conditions of normal operation of the power line 90.

The term "normal operating conditions" is intended as any operating situation in which the electrical power to supply the electronic unit 1 can be drawn from the power line 90, from an external source of electrical power and/or from any electronic backup circuits.

The stage 10 can comprise one or more direct power supply devices 101, for example one or more current and/or voltage transformers, suitable to draw the electrical power required to supply the electronic unit 1 from the power line 90.

The stage 10 can also comprise at least one indirect power supply device 102, for example a connector suitable to draw power from an external source of electrical power (not shown), different from the power line 90.

To manage operation of the stage 10, an electronic stage 30A to manage the main power supply of the electronic unit 1 is advantageously provided in the control unit 3.

Preferably, the stage 30A comprises one or more electronic backup circuits 39 (for example comprising one or more backup capacitances).

The backup circuits 39 are provided to guarantee continuity of the main power supply for a predetermined period of time, if the power supply devices 101-102 are not operating.

Preferably, the backup circuits 39 are controlled by one or more electronic enabling circuits 33, appropriately driven by second electronic driving means, which preferably comprise appropriate second computerized means 34, for example, one or more software programs, codes, modules and/or routines which can be executed by a digital processing device, preferably a microcontroller 35.

The electronic protection unit 1 is also provided with an auxiliary power supply stage 20, suitable to supply the electronic power supply 1 in emergency conditions.

The term "emergency conditions" is intended as any operating situation in which the electrical power to supply the electronic unit 1 can no longer, for any reason, be drawn from the power line 90, from an external electrical power source and/or from any backup devices.

Figure 2:
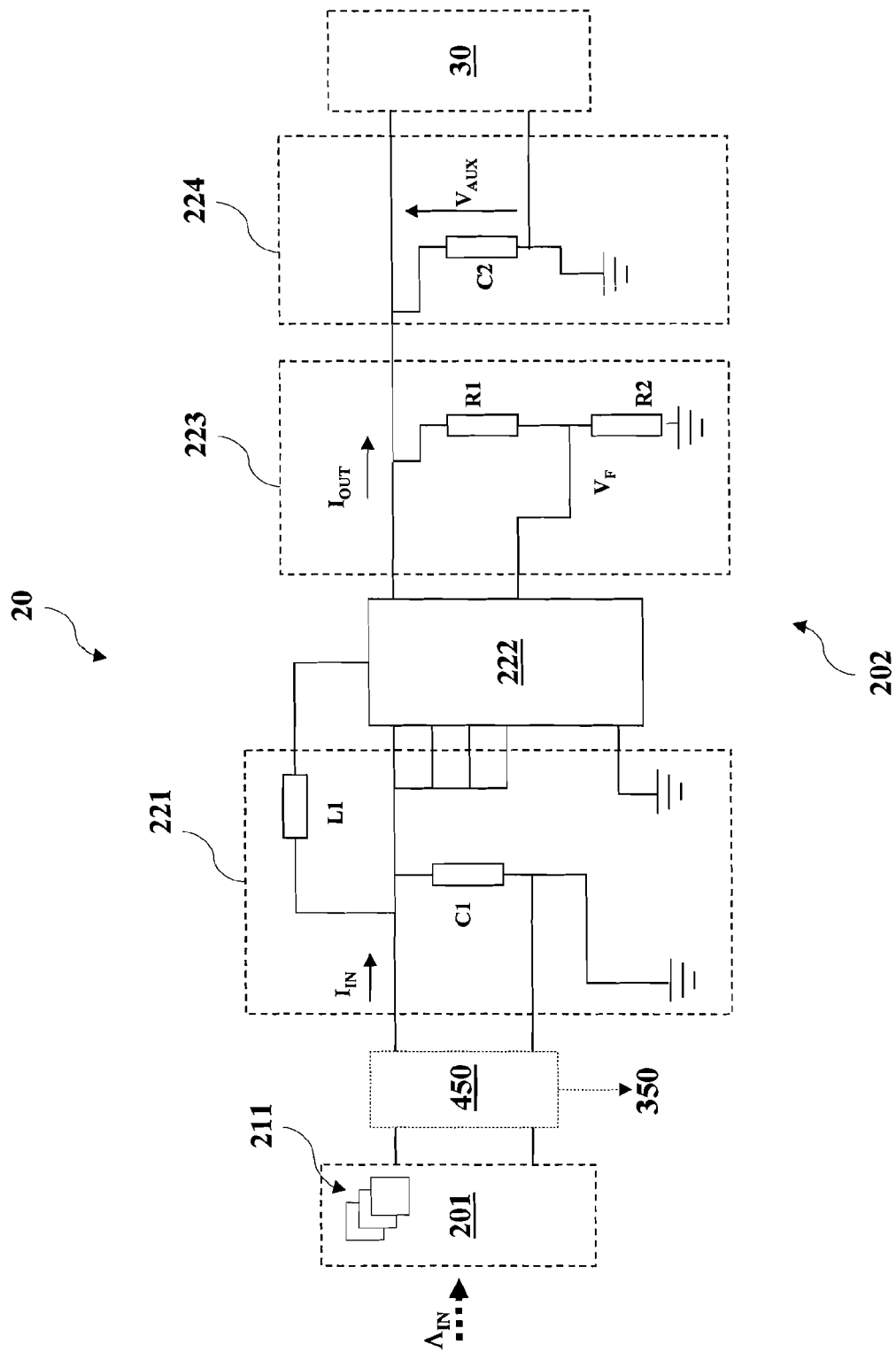
FIG. 2 is a schematic block diagram of a portion of the auxiliary power supply stage of the electronic protection unit according to the invention.

The auxiliary power supply stage 20 comprises (FIGS. 1-2) electronic means 201-202 suitable to generate an auxiliary power supply voltage $V_{AUX}$, in response to an incoming light radiation $\Lambda_{IN}$ received in input.

The light radiation $\Lambda_{IN}$ can be represented, for example, by sunlight or by a light radiation generated by a source utilized by the operator, for example an electric torch.

Preferably, said electronic means comprise an electronic photovoltaic conversion stage 201, suitable to generate in output a photovoltaic conversion current $I_{IN}$, the intensity of which depends on the intensity of the light radiation $\Lambda_{IN}$, received in input.

The electronic stage 201 advantageously comprises one or more cells and/or photovoltaic modules 211, advantageously positioned on the outer surface 110 of the electronic unit 1 (FIG. 3), so as to efficiently receive the light radiation $\Lambda_{IN}$.

Downstream of the electronic stage 201, an electronic conditioning stage 202 is preferably provided, suitable to supply a stable level for the auxiliary power supply voltage $V_{AUX}$.

An electronic detection stage 450 is also preferably present, advantageously comprising one or more current sensors (for example a resistive shunt) to supply data 350 indicating the intensity of the current $I_{IN}$.

Preferably, the electronic stage 202 comprises an electronic input circuit 221 suitable to process the current signal $I_{IN}$ coming from the electronic stage 201. The electronic circuit 221 advantageously comprises a capacitance C1 and an inductance L1, in a step-up configuration, in order to stabilize the voltage $V_{AUX}$ starting from variable values of the input current $I_{IN}$.

An electronic switching circuit 222 is provided downstream of the electronic circuit 221, suitable to generate in output a switching current $I_{OUT}$, the average value of which depends on the trend of the current $I_{IN}$.

The current $I_{OUT}$ is sent to an electronic output circuit 224 comprising a storage capacitance C2, from the ends of which the auxiliary power supply voltage $V_{AUX}$ can be drawn.

Preferably, an electronic feedback circuit 223 is also provided, comprising a resistive divider R1-R2 so as to supply the electronic circuit 222 with a feedback signal $V_F$ relative to the trend of the voltage $V_{AUX}$.

To manage the power supply stage 20, the control unit 3 preferably comprises an electronic stage 30B to manage the auxiliary power supply.

The electronic stage 30B preferably comprises one or more electronic power switching circuits 31 and first electronic driving means to drive the electronic circuits 31.

The first electronic driving means preferably comprise suitable first computerized means 32, for example one or more software programs, codes, modules and/or routines which can be executed by a digital processing device, preferably by the microcontroller 35.

The main function of the electronic stage 30B is to enable execution of one or more operating functions $F_1$-$F_N$ of the control unit 3, on the basis of the electrical power made available by the auxiliary power supply stage 20.

Given that execution of these functions $F_1$-$F_N$ necessarily requires a certain input electrical power, each function is advantageously selected as a function of the intensity of the photovoltaic conversion current $I_{IN}$, detected through the electronic stage 450.

Alternatively, each of these functions can be selected as a function of the intensity of the switching current $I_{OUT}$, which can be detected through the electronic circuit 223.

The functions $F_1$-$F_N$ preferably comprise at least one viewing function $F_I$ of sets of predetermined information $I_1$-$I_M$, relative to the operating state of the power line 90.

Advantageously, the sets of information which can be viewed present different information contents, which can be selected as a function of the electrical power available and, therefore, of the level assumed by the current $I_{IN}$.

In the simplest case, when the current $I_{IN}$ is relatively low, the function $F_I$ concerns viewing of a series of luminous warnings $I_1$ relative to the type of fault detected and/or to the type of operation performed by the electronic unit 1. For this purpose, the electronic stage 30B can activate the LED devices 37 (FIGS. 2-3) directly, without requiring to involve the microcontroller 35.

If the auxiliary electrical power available is higher, the function $F_I$ can concern the viewing of other sets of information $I_2$-$I_M$, through the display 36, controlled by the microcontroller 35. For example, the set of information $I_2$ can comprise information of relatively low level (i.e. alphanumeric indications of the type of operation performed or of the type of fault detected) while the sets $I_3$-$I_M$, which can be selected when the power available increases, can present gradually more and more complete and articulate information, up to inclusion of all the information available during normal operation of the electronic unit 1.

Alternatively, again in the event of the current $I_{IN}$ being relatively low, the function $F_I$ can concern viewing of a plurality of sets of information $I_1$-$I_M$, as long as a sequential viewing scheme is advantageously adopted, for example according to cycles $I_1$-$I_2$- . . . -$I_M$.

Naturally, the electronic stage 30B can enable functions of different type with respect to the viewing functions $F_1$ of the sets of information $I_1$-$I_M$.

These functions, again enabled as a function of the level of electrical power available, can have the same or different priorities with respect to the function $F_I$ and can, for example, range from simple activation of the clock of the microcontroller 35 to activation of specific portions of the control unit 3 (for example, the LED devices 37, the display 36 and/or the communication interface 38), up to complete recovery of the control unit 3 operation.

Moreover, with sufficient auxiliary power available, the operator can take action to reconfigure, in the most appropriate manner, the operating parameters and functions of the electronic unit 1.

Alternatively, again as a function of the electrical power available, the functions $F_1$-$F_N$ can also be enabled sequentially.

Operation of the electronic unit 1 is now described in greater detail.

In normal operating conditions, the electronic unit 1 is supplied by the main power supply stage 10.

In this operating situation, the auxiliary stage 20 can supply electrical power in parallel to the aforesaid main power supply stage 10 (for example, through an electric torch or by exposing the electronic unit 1 to the lighting present in the substation, or in the panel, or to solar radiation).

This determines generation of an auxiliary power supply voltage $V_{AUX}$.

On the basis of the level of electrical power available, the electronic stage 30B enables certain functions $F_1$-$F_N$ of the control unit 3, even performing complete recovery of its functions.

In particular, the operator can view sets of information $I_1$-$I_M$ relative to the operating state of the power line 90.

The complexity/articulation of the information viewed and of the functions which can be enabled increases with the level of power available, up to viewing of all the information and enabling of all the functions which can be obtained during normal operation of the electronic protection unit 1.

When the level of power available allows a minimal level of functions to be activated, complete articulation of the information viewed and of the functions which can be enabled can be obtained by adopting a sequential viewing/enabling scheme, for example according to cycles $I_1$-$I_2$- . . . $I_M$ or $F_1$-$F_2$- . . . -$F_N$.

From the above, it is evident how the present invention also relates to a process 500 to manage an electronic protection unit of a power line 90, in emergency conditions, in particular to obtain information relative to the operating state of said power line.

The process 500 preferably comprises a first step 501 of illuminating, with a light radiation source $\Lambda_{IN}$, at least a portion of the electronic unit 1.

A step 502 is then provided to convert the light radiation, thus supplied, into an auxiliary power supply voltage $V_{AUX}$ to supply the electronic unit 1.

Finally, a step 503 can be provided to enable execution of the operating functions $F_1$-$F_N$ of the electronic unit 1, as a function of the level of electrical power which can be obtained through conversion of the light radiation, thus supplied.

These functions comprise at least one function $F_I$ for viewing sets of predetermined information $I_1$-$I_M$, relative to the operating state of the power line 90, each of the sets $I_1$-$I_M$ being selected as a function of the level of electrical power made available by the aforesaid conversion of the light radiation supplied.

The electronic unit 1 has been described with specific reference to the embodiments shown in FIGS. 1-4.

Variants of embodiment, all falling within the scope of the present invention, are possible. For example, several viewing functions $F_{I1}$-$F_{IM}$ could be provided, each of which is specifically intended for viewing a corresponding set of information $I_1$-$I_M$.

Moreover, the electronic stages 30A and 30B could be integrated in a single electronic interface 30 connecting the power supply stages 10, 20 and the control unit 3.

Advantageously, the electronic interface 30 could comprise a dedicated microcontroller (not shown), different from the microcontroller 35. In this case, the described computerized means 32 and 34 could reside (and be executed) in this dedicated microcontroller.

Finally, the storage capacitance C2 of the electronic circuit 224 could be one of the backup capacitances of the backup circuits 39, so as to obtain greater integration of the circuit components of the electronic unit 1.

In a further embodiment of the electronic unit 1, the digital processing device 35 could be replaced by a set of analog electronic circuits, produced according to more conventional techniques.

Moreover, the aforesaid first and second electronic driving means could comprise (in addition or alternatively to the aforesaid computerized means 32-34) one or more electronic circuits of analog type.

It has been seen in practice how the electronic protection unit and the relative process according to the invention achieve the aim and the objects set.

The electronic protection unit according to the invention is, in fact, easy to manage or activate in emergency conditions (permanently or temporarily) at any moment and allows information concerning the operating state of the power line controlled to be obtained with extreme ease.

The completeness of the information which can be obtained can be selected indirectly by the operator, by suitably modulating the intensity of the light radiation received in input.

With sufficiently high levels of electrical power available, the operator can also take action to reconfigure, if necessary, the functions and/or operating parameters of the control unit.

The electronic protection unit according to the invention is therefore particularly suitable for use in difficult environmental situations (for example, far from major roads) or in operating situations in which it can be foreseen that it may be difficult for the operator to inspect the state of the power line (for example, inside a tunnel).

As is evident from the above, the electronic protection unit according to the invention presents a particularly simple structure, easy to produce at industrial level and at competitive costs.

The electronic protection unit thus conceived may undergo further numerous modifications and variants, all falling within the scope of the inventive concept. Moreover, all the details can be replaced with other technically equivalent ones.

The invention claimed is:

1. An electronic protection unit for automatic circuit breakers-comprising:
    a control unit;
    a main power supply stage and an auxiliary power supply stage suitable to supply electrical power to said control unit;
    wherein said auxiliary power supply stage comprises electronic means suitable to generate an auxiliary power supply voltage ($V_{AUX}$), in response to a light radiation ($\Lambda i_N$) received in input;
    said control unit being configured to manage said auxiliary power supply to enable, in response to said auxiliary power supply voltage received in input, the execution of one or more functions ($F_1$-$F_N$) of said control unit, said one or more of said function being selected as a function of the level of electrical power made available by said auxiliary power supply stage.

2. Electronic protection unit as claimed in claim 1, characterized in that said auxiliary power supply stage comprises: an electronic photovoltaic conversion stage suitable to generate in output a photovoltaic conversion current ($I_{IN}$), in response to said light radiation received in input; and an electronic conditioning stage suitable to supply a stable level for said auxiliary power supply voltage.

3. Electronic protection unit as claimed in claim 2, characterized in that said electronic photovoltaic conversion stage comprises one or more photovoltaic cells and/or modules.

4. Electronic protection unit as claimed in claim 3, characterized in that said electronic conditioning stage comprises:
    an electronic input circuit suitable to receive in input said photovoltaic conversion current; and
    an electronic switching circuit, suitable to generate m output a switching current ($I_{OUT}$); and
    an electronic output circuit, suitable to receive in input said switching current and to generate in output said auxiliary power supply voltage; and
    an electronic feedback circuit suitable to supply said electronic switching circuit with a feedback signal ($V_F$) relative to the trend of said auxiliary power supply voltage.

5. Electronic protection unit as claimed in claim 3, characterized in that said, auxiliary power supply stage also comprises an electronic detection stage suitable to supply data indicating said photovoltaic conversion current.

6. Electronic protection unit as claimed in claim 2, characterized in that said electronic conditioning stage comprises:
    an electronic input circuit suitable to receive in input said photovoltaic conversion current; and
    an electronic switching circuit, suitable to generate in output a switching current ($I_{OUT}$); and
    an electronic output circuit, suitable to receive in input said switching current and to generate in output said auxiliary power supply voltage; and
    an electronic feedback circuit suitable to supply said electronic switching circuit with a feedback signal ($V_F$) relative to the trend of said auxiliary power supply voltage.

7. Electronic protection unit as claimed in claim 6, characterized in that said auxiliary power supply stage also comprises an electronic detection stage suitable to supply data indicating said photovoltaic conversion current.

8. Electronic protection unit as claimed in claim 2, characterized in that said auxiliary power supply stage also comprises an electronic detection stage suitable to supply data indicating said photovoltaic conversion current.

9. Electronic protection unit as claimed in claim 1, characterized in that said auxiliary power supply stage also comprises an electronic detection stage suitable to supply data indicating said photovoltaic conversion current.

10. Electronic protection unit as claimed in claim 1, characterized in that said functions comprise at least one function (Fi) for viewing differentiated sets of predetermined information ($I_1$-$I_M$) relative to the operating state of a power line, one or more of said sets of predetermined information being selected as a function of the level of electrical power made available by said auxiliary power supply state.

11. Electronic protection unit as claimed in claim 10, characterized in that it comprises one or more warning devices to view one or more of said sets of predetermined information.

12. Electronic protection unit as claimed in claim 1, characterized in that said electronic stage to manage the auxiliary power supply comprises:
    one or more electronic power switching circuits; and
    first electronic driving means suitable to drive said electronic power switching circuits.

13. Electronic protection unit as claimed in claim 12, characterized in that said first electronic driving means comprise first computerized means which can be executed, by a digital processing device.

14. Electronic protection unit as claimed in claim 13, characterized in that said first computerized means can be executed by a microcontroller on said electronic control unit.

15. Electronic protection unit as claimed in claim 1, characterized in that it comprises an electronic stage to manage the main power supply of said electronic protection unit, said electronic stage to manage the main power supply and said electronic stage to manage the auxiliary power supply being integrated in a single electronic connection interface.

16. Automatic circuit breaker, characterized in that it comprises an electronic protection unit as claimed in claim 1.

17. Process to manage, in emergency conditions, an electronic protection unit for automatic circuit breakers of a power line, comprising:
    illuminating with a light radiation ($\Lambda_{IN}$) at least a portion of said electronic protection unit; and
    converting said light radiation into an auxiliary power supply voltage ($V_{AUX}$) to supply said electronic protection unit;
    enabling execution of one or more functions ($F_1$-$F_N$) of said electronic protection unit, said functions comprising at least one function (Fi) for viewing differentiated sets of predetermined information (Ii-$I_M$) relative to the operating state of said power line, one or more of said sets of predetermined information being selected as a function of the level of electrical power made available through conversion of said light radiation.

* * * * *